US007928165B2

(12) United States Patent
Datta et al.

(10) Patent No.: US 7,928,165 B2
(45) Date of Patent: *Apr. 19, 2011

(54) TRANSPARENT AND TRANSLUCENT CROSSLINKED PROPYLENE-BASED ELASTOMERS, AND THEIR PRODUCTION AND USE

(75) Inventors: Sudhin Datta, Houston, TX (US); Abdelhadi Sahnoune, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/987,794

(22) Filed: Nov. 12, 2004

(65) Prior Publication Data

US 2005/0107530 A1 May 19, 2005

Related U.S. Application Data

(60) Provisional application No. 60/519,975, filed on Nov. 14, 2003.

(51) Int. Cl.
C08F 210/06 (2006.01)
C08F 210/18 (2006.01)

(52) U.S. Cl. .................................. 525/192; 525/232

(58) Field of Classification Search .................. 525/232, 525/192
See application file for complete search history.

(56) References Cited

U.S. PATENT DOCUMENTS

| | | |
|---|---|---|
| 2,972,600 A | 2/1961 | Braidwood |
| 3,248,179 A | 4/1966 | Norwood |
| 3,287,440 A | 11/1966 | Giller |
| 3,806,558 A | 4/1974 | Fischer |
| 4,311,628 A | 1/1982 | Abdou-Sabet et al. ............ 260/33.6 AQ |
| 4,368,565 A | 1/1983 | Schwarz |
| 4,540,753 A | 9/1985 | Cozewith et al. |
| 4,543,399 A | 9/1985 | Jenkins, III et al. |
| 4,588,790 A | 5/1986 | Jenkins, III et al. |
| 4,603,158 A * | 7/1986 | Markham et al. ............ 524/100 |
| 4,613,484 A | 9/1986 | Ayres et al. |
| 4,820,142 A | 4/1989 | Balk |
| 5,001,205 A | 3/1991 | Hoel |
| 5,028,670 A | 7/1991 | Chinh et al. |
| 5,108,820 A | 4/1992 | Kaneko et al. |
| 5,198,401 A | 3/1993 | Turner et al. |
| 5,229,478 A | 7/1993 | Floyd et al. ............ 526/160 |
| 5,290,886 A | 3/1994 | Ellul ............ 524/515 |
| 5,317,036 A | 5/1994 | Brady, III et al. |
| 5,324,576 A | 6/1994 | Reed et al. |
| 5,336,552 A | 8/1994 | Strack et al. |
| 5,352,749 A | 10/1994 | DeChellis et al. |
| 5,382,400 A | 1/1995 | Pike et al. |
| 5,391,629 A | 2/1995 | Turner et al. |
| 5,397,832 A | 3/1995 | Ellul |
| 5,405,922 A | 4/1995 | DeChellis et al. |
| 5,436,304 A | 7/1995 | Griffin et al. |
| 5,453,471 A | 9/1995 | Bernier et al. |
| 5,462,999 A | 10/1995 | Griffin et al. |
| 5,504,172 A | 4/1996 | Imuta et al. |
| 5,525,675 A | 6/1996 | Masuda et al. |
| 5,543,438 A | 8/1996 | Shibayama et al. |
| 5,616,661 A | 4/1997 | Eisinger et al. |
| 5,627,242 A | 5/1997 | Jacobsen et al. |
| 5,656,693 A | 8/1997 | Ellul et al. ............ 525/171 |
| 5,665,818 A | 9/1997 | Tilston et al. |
| 5,668,228 A | 9/1997 | Chinh et al. |
| 5,677,375 A | 10/1997 | Rifi et al. |
| 5,693,727 A | 12/1997 | Goode et al. |
| 5,712,352 A | 1/1998 | Brant et al. |
| 5,936,028 A | 8/1999 | Medsker et al. |
| 6,069,849 A | 5/2000 | Kingsley et al. |
| 6,162,872 A | 12/2000 | Berta |
| 6,207,756 B1 | 3/2001 | Datta et al. ............ 525/191 |
| 6,245,856 B1 | 6/2001 | Kaufman et al. ............ 525/240 |
| 6,265,493 B1 | 7/2001 | Chung et al. ............ 525/247 |
| 6,319,998 B1 * | 11/2001 | Cozewith et al. ............ 526/65 |
| 6,329,477 B1 | 12/2001 | Harrington et al. ............ 526/65 |
| 6,342,565 B1 | 1/2002 | Cheng et al. ............ 525/191 |
| 6,388,016 B1 | 5/2002 | Abdou-Sabet et al. ............ 525/194 |
| 6,525,157 B2 | 2/2003 | Cozewith et al. ............ 526/348 |

(Continued)

FOREIGN PATENT DOCUMENTS

EP 0 374 695 6/1990

(Continued)

OTHER PUBLICATIONS

U.S. Appl. No. 10/988,161, filed Nov. 12, 2004, entitled "Propylene-Based Elastomers and Uses Thereof", Datta et al.
U.S. Appl. No. 10/987,670, filed Nov. 12, 2004, entitled "Articles Comprising Propylene-Based Elastomers", Datta et al.
U.S. Appl. No. 10/988,162, filed Nov. 12, 2004, entitled "High Strength Propylene-Based Elastomers and Uses Thereof", Datta et al.
ASTM International Designation: D 1003-00, "Standard Test Method for Haze and Luminous Transmittance of Transparent Plastics[1]," Jun. 2006, pp. 1-6.

(Continued)

Primary Examiner — Jeffrey C Mullis

(57) ABSTRACT

The present invention provides a crosslinked propylene-based elastomer having an isotactic propylene triad tacticity of from 65 to 95%, a melting point by DSC equal to or less than 110° C., a heat of fusion of from 5 J/g to 50 J/g, and a haze % per 100 mil thickness of 95 or less, and comprising at least 75 wt % propylene-derived units, at least 5 wt % ethylene-derived units, and optionally 10 wt % or less of diene-derived units. In an embodiment, the present invention is a blend of a continuous phase of the crosslinked propylene-based elastomer and a dispersed phase of a crystalline polymeric compound. The present invention also provides elastomeric compositions comprising a crosslinked propylene-based elastomer as described herein and 100 parts by weight or less of a pigment per 100 parts of polymer. The present invention also provides films, fibers, nonwovens, molded objects, and extruded forms which include any of the inventive compositions described herein.

20 Claims, No Drawings

U.S. PATENT DOCUMENTS

| | | | |
|---|---|---|---|
| 7,193,024 B2 | 3/2007 | Arriola et al. | |
| 2001/0008695 A1* | 7/2001 | Bolton et al. | 428/442 |
| 2001/0047069 A1 | 11/2001 | Chung et al. | 526/336 |
| 2003/0204017 A1 | 10/2003 | Stevens et al. | |
| 2003/0236352 A1* | 12/2003 | Winowiecki | 525/191 |
| 2003/0236852 A1 | 12/2003 | Fernandes et al. | |
| 2004/0241360 A1* | 12/2004 | Giblin et al. | 428/35.7 |
| 2005/0107529 A1* | 5/2005 | Datta et al. | 525/70 |
| 2005/0107534 A1* | 5/2005 | Datta et al. | 525/191 |
| 2005/0131142 A1* | 6/2005 | Datta et al. | 525/71 |
| 2005/0234172 A1* | 10/2005 | Musgrave et al. | 524/379 |
| 2007/0021561 A1* | 1/2007 | Tse et al. | 525/88 |

FOREIGN PATENT DOCUMENTS

| | | |
|---|---|---|
| EP | 0 401 993 | 12/1990 |
| EP | 0 634 421 | 1/1995 |
| EP | 0 794 200 | 9/1997 |
| EP | 0 802 202 | 10/1997 |
| EP | 0 844 278 | 5/1998 |
| EP | 964641 | 7/1998 |
| EP | 0 893 245 | 1/1999 |
| EP | 946640 | 10/1999 |
| EP | 1003814 | 5/2000 |
| GB | 1238419 | 7/1971 |
| JP | S52-034150 | 3/1977 |
| JP | S52-037953 | 3/1977 |
| JP | H08-092337 | 4/1996 |
| JP | 8-113657 | 5/1996 |
| RU | 660982 | 5/1979 |
| WO | WO 96/08520 | 3/1996 |
| WO | WO 96/33227 | 10/1996 |
| WO | WO 97/22639 | 6/1997 |
| WO | WO 98/27155 | 6/1998 |
| WO | WO 99/45046 | 9/1999 |
| WO | WO00/69963 | 11/2000 |
| WO | WO00/69964 | 11/2000 |
| WO | WO 00/70134 | 11/2000 |
| WO | WO0234795 | 5/2002 |
| WO | WO02051928 | 7/2002 |
| WO | WO 02/083754 | 10/2002 |
| WO | WO 02/102263 | 12/2002 |
| WO | WO 03/025036 | 3/2003 |
| WO | WO 03/025037 | 3/2003 |
| WO | WO 03/025038 | 3/2003 |
| WO | WO 03/025084 | 3/2003 |
| WO | WO 03/040065 | 5/2003 |

OTHER PUBLICATIONS

U.S. Appl. No. 10/987,670 USPTO Office Action dated Oct. 18, 2006.
U.S. Appl. No. 10/987,670 USPTO Office Action dated Feb. 7, 2007.
U.S. Appl. No. 10/987,670 USPTO Office Action dated Aug. 14, 2007.
U.S. Appl. No. 10/987,670 USPTO Office Action dated Jan. 30, 2008.
U.S. Appl. No. 10/987,670 USPTO Office Action dated Nov. 10, 2008.
U.S. Appl. No. 10/987,794 USPTO Office Action dated Oct. 26, 2005.
U.S. Appl. No. 10/987,794 USPTO Office Action dated Feb. 8, 2006.
U.S. Appl. No. 10/987,794 USPTO Office Action dated Aug. 31, 2006.
U.S. Appl. No. 10/987,794 USPTO Advisory Action dated Nov. 15, 2006.
U.S. Appl. No. 10/987,794 USPTO Office Action dated Mar. 5, 2007.
U.S. Appl. No. 10/987,794 USPTO Office Action datd Oct. 11, 2007.
U.S. Appl. No. 10/987,794 USPTO Advisory Action dated Dec. 21, 2007.
U.S. Appl. No. 10/987,794 USPTO Office Action dated Feb. 14, 2008.
U.S. Appl. No. 10/987,794 USPTO Office Action dated Aug. 18, 2008.
U.S. Appl. No. 10/987,794 USPTO Advisory Action dated Dec. 3, 2008.
U.S. Appl. No. 10/987,794 USPTO Office Action dated Feb. 27, 2009.
U.S. Appl. No. 10/988,162 USPTO Office Action dated Oct. 23, 2006.
U.S. Appl. No. 10/988,162 USPTO Office Action dated Feb. 7, 2007.
U.S. Appl. No. 10/988,162 USPTO Office Action dated Aug. 14, 2007.
U.S. Appl. No. 10/988,162 USPTO Office Action dated Jan. 14, 2008.
U.S. Appl. No. 10/988,162 USPTO Office Action dated Aug. 13, 2008.
W. Hoffman, "3 *Synthetic Rubber*", Rubber Technology Handbook, Hanser Publisher, Munich, 1988, pp. 42-52.
L. M. Wheeler et al., "*Gel Permeation Chromatography/Fourier Transform Infrared Interface for Polymer Analysis*", Applied Spectroscopy, 1993, vol. 47, No. 8, pp. 1128-1130.
H. N. Cheng, "$^{13}C$ *NMR Analysis of Ethylene-Propylene Rubbers*", Macromolecules, 1984, vol. 17, pp. 1950-1955.
A. C. Ouano et al., "*Gel Permeation Chromatography*", Polymer Molecular Weights Part II, ed. P.E. Slade, 1975, pp. 287-368.
F. Rodriguez, "*The Molecular Weight of Polymers*", Principles of Polymer Systems $3^{rd}$ ed., Hemisphere Pub. Corp., NY, 1989, pp. 155-160.
G. Ver Strate et al., "*Near Monodisperse Ethylene-Propylene Copolymers by Direct Ziegler-Natta Polymerization. Preparation, Characterization, Properties*", Macromolecules, 1988, vol. 21, pp. 3360-3371.
R. Lowery, "*Hydrocarbon Resins*", Kirk-Othmer Encyclopedia of Chemical Technology $4^{th}$ ed., 1995, vol. 13, pp. 717-743.

\* cited by examiner

TRANSPARENT AND TRANSLUCENT CROSSLINKED PROPYLENE-BASED ELASTOMERS, AND THEIR PRODUCTION AND USE This application claims the benefit of U.S. Provisional Application No. 60/519,975, filed Nov. 14, 2003, the entire disclosure of which is hereby incorporated herein by reference.

FIELD OF THE INVENTION

The present invention is directed generally to crosslinked propylene-based elastomers having an isotactic propylene triad tacticity of from 65 to 95%, a melting point by DSC equal to or less than 110° C., a heat of fusion of from 5 J/g to 50 J/g, and a haze % per 100 mil thickness of 95 or less. The propylene-based elastomers of the invention comprise at least 75 wt % propylene-derived units, at least 5 wt % ethylene-derived units, and optionally 10 wt % or less of diene-derived units. The invention is also directed to elastomeric compositions comprising such a crosslinked propylene-based elastomer and 100 parts by weight or less of a pigment per 100 parts of polymer. Embodiments of the invention also include films, fibers, nonwovens, molded objects, and extruded forms which include such compositions. Especially preferred embodiments and applications of the invention are those in which some measure of transparency or translucency is desired.

BACKGROUND

Amorphous and partially crystalline (generally referred to as semi-crystalline) polymers can provide elastomeric properties as defined, for example, in ASTM D1566. An important class of elastomers is derived from polyolefins, generally using addition polymerization with a Ziegler-Natta type catalyst system. Currently, polyolefin elastomers are interpolymers of ethylene, a crystallinity-disrupting α-olefin such as propylene, which provides short chain branches, and optionally small amounts of a polyene, such as a diene, to provide unsaturated short chain branches useful in providing crosslinks between different chains. These interpolymers may be ethylene propylene copolymers (EP) not containing units derived from diene, or ethylene propylene diene terpolymers (EPDM).

Different technologies exist for curing EP and EPDM interpolymers. Curing can proceed progressively from an initial creation of long chain branches where a macromer or polymer chain inserts itself along the length of an already formed polymer, to an intermediate form in which the cured polymer is partly soluble and partly insoluble, to a fully cured form in which the bulk of it is insoluble and substantially all polymer chains are linked into a network and no isolated polymer chains remain for individual extraction.

A person skilled in the art selects the interpolymer, the curing/crosslinking systems, and other formulation ingredients to balance processability and physical properties of the final product such as aging, hardness, extensability, compression set, tensile strength, and performance when cold.

EP 964641, EP 946640, EP 1003814, U.S. Pat. No. 6,245,856, and U.S. Pat. No. 6,525,157, and others disclose polyolefin interpolymers that are elastomers and have crystallinity resulting from isotactically-arranged propylene-derived sequences in the polymer chain. This is in contrast with the EP and EPDM interpolymers in current commercial use whose crystallinity is due to ethylene-derived sequences. The properties of such propylene-based elastomers are different in many aspects from known EP and EPDM interpolymer elastomers. Use of dienes for these new propylene-based elastomers has been contemplated. See, for example, WO 00/69964, including at page 15, lines 18 to 25.

SUMMARY OF THE INVENTION

In one aspect, the invention provides propylene-based elastomers which are cured to various degrees so as to further enlarge the elastomeric performance envelope of the elastomers and permit convenient processing.

In another aspect, the improved propylene-based elastomer includes a diene to facilitate curing and optimal end use performance in various options of formulation and processing.

In another aspect, the invention provides an improved formulation containing such propylene-based elastomer to provide appearance and end use performance characteristics not achievable with EP and EPDM interpolymer elastomers.

It has been surprisingly found that novel crosslinked propylene-based elastomers can be prepared that are transparent or translucent and have high ultimate tensile strength and tear strength. In a particular embodiment, these crosslinked propylene-based elastomers have improved ultimate tensile strength and Die C tear strength compared to crosslinked compositions made from commercially available EPDM.

In one embodiment, the invention provides a crosslinked elastomer having an isotactic propylene triad tacticity of from 65 to 95%, a melting point by DSC equal to or less than 110° C., a heat of fusion of from 5 J/g to 50 J/g, and a haze % per 100 mil thickness of 95 or less. The crosslinked elastomer comprises at least 75 wt % propylene-derived units, at least 5 wt % ethylene-derived units, and optionally 10 wt % or less of diene-derived units.

In another embodiment, the invention provides an elastomeric composition comprising a crosslinked propylene-based elastomer as described herein and 100 parts by weight or less of a pigment per 100 parts of polymer.

In another embodiment, the invention provides an article, such as a film, fiber, nonwoven, molded object, or extruded form which includes any of the inventive compositions described herein.

DETAILED DESCRIPTION

Optical Properties

In the preferred embodiment, the present invention relates to elastomeric materials having good strength and tear properties while also having significant transparency or translucency. Preferred embodiments include a blend of one or more propylene based elastomers and a second polymer, most preferably isotactic propylene, with at least one of the propylene based elastomer and the second polymer being cross-linked. Transparency is measured as a maximum value of haze % per 100 mil thickness of a sample of the material measured in the manner more fully set out in "Test Methods", below. The crosslinked propylene-based elastomer of the present invention, and compositions of the present invention which comprise such propylene-based elastomers, have a haze % per 100 mil thickness preferably of 95 or less, or 80 or less, or 60 or less, or 50 or less, or 40 or less, or 30 or less, or 20 or less.

In an embodiment of the present invention, the compositions further comprise a non-black pigment. The pigment, though not significantly affecting the transparency of the crosslinked article, can impart a tint or color. The pigment may be any color, or tint, for example white, red, green, blue, or yellow.

Crosslinking

In one embodiment, the strength, tear resistance and other performance properties of the propylene-based elastomer are improved by crosslinking the elastomer to a preselected degree. In another embodiment, the propylene-based elastomer is crosslinked to various degrees to permit convenient processing. In certain embodiments, the propylene-based elastomer includes a diene to facilitate crosslinking and optimal end use performance in various options of formulation and processing. In other embodiments, such as when using radiation to induce crosslinking, the presence of diene in the propylene-based elastomer is optional.

As used herein, the term "crosslinked" refers to a composition wherein the polymer chains have been joined by one or more conventional crosslinking procedures so as to provide a composition having at least 2 wt % insolubles based on the total weight of the composition and/or a composition having a viscosity ratio of from 1 to 10. In a particular embodiment, the propylene-based elastomer is crosslinked to a degree so as to provide a composition having at least 2 wt %, or at least 5 wt %, or at least 10 wt %, or at least 20 wt %, or at least 35 wt %, or at least 45 wt %, or at least 65 wt %, or at least 75 wt %, or at least 85 wt %, or less than 95 wt % insolubles in any solvent that dissolves the composition prior to crosslinking. In another particular embodiment, the propylene-based elastomer is crosslinked to a degree so as to provide composition having a viscosity ratio of from 1.1 to 100, or, from 1.2 to 50, or yet more preferably from 2.0 to 20 and most preferably from 5.0 to 10.

Typically, the ultimate tensile strength of a particular material is affected by the MFR of the uncrosslinked compound; e.g., those materials having a lower beginning viscosity (i.e., higher MFR) typically have a lower ultimate tensile strength. It is therefore surprising that the crosslinked propylene-based elastomers of the present have a high ultimate tensile strength without having a high viscosity prior to crosslinking. For example, in a particular embodiment, the crosslinked propylene-based elastomers of the present invention have an ultimate tensile strength (TS), of 0.5 MPa or greater, while having a starting viscosity of 25 MFR. In a particular aspect of this embodiment, the ratio of the Shore A hardness to MFR@230° C. of the propylene-based elastomer, prior to crosslinking, and the ultimate tensile strength (TS), measured in MPa, of the crosslinked propylene-based elastomer, satisfy the following equation: (Shore A hardness/MFR@230° C.)$\leq$1.66*TS$-B_1$, where $B_1$ is 0, or 3.33, or 6.66, or 10.

Generally, the Die C tear strength of a material is affected by the MFR of the uncrosslinked compound; e.g., those materials having a lower viscosity (i.e., higher MFR) generally have a lower Die C tear strength. Conversely, those materials which have a high Shore A hardness also inherently have a high Die C tear strength. It is therefore surprising that the crosslinked propylene-based elastomers of the present invention have a high Die C tear strength without having a high viscosity. For example, in a particular embodiment, the crosslinked propylene-based elastomers of the present invention have a Die tear strength (Die C), measured in lb force/inch, of 50 or greater. In a particular aspect of this embodiment, the ratio of the Shore A hardness to MFR@230° C. of the propylene-based elastomer, prior to crosslinking, and the Die C tear strength, measured in lb force/inch, of the crosslinked propylene-based elastomer, satisfy the following equation: (Shore A hardness/MFR@230° C.)$\leq$0.2*Die C$-B_2$, where $B_2$ is 0, or 10, or 20, or 30.

The compositions described herein may be prepared by any procedure that provides an intimate mixture of the polymeric components. Generally, the first step of the process is mixing the polymeric components and optional additives, such as process oil, fillers, colorants, antioxidants, nucleators, and flow improvers using equipment such as, but not limited to, a Carver press for melt pressing the components together, internal mixers such as a Banbury mixer or a Brabender mixer for solution or melt blending of the components, and equipment used for continuous mixing procedures including single and twin screw extruders, static mixers, impingement mixers, as well as other machines and processes designed to disperse the components in intimate contact. A complete mixture of the polymeric components is indicated by the uniformity of the morphology of the composition. Such procedures are well known to those of ordinary skill in the art. In one embodiment, the next step is mixing a chemical curative, such as peroxides or sulfur compounds, with the intimate mixture, and then fabricating the intimate mixture including the chemical curative into the final shape of the article and raising the temperature for an extended period of time to allow the crosslinking of the propylene-based elastomer. In another embodiment, the next step is fabricating the intimate mixture into the final shape of the article, and then exposing the fabricated mixture to an external curative agent, such as high energy radiation, to induce crosslinking of the propylene-based elastomer.

The curing systems that may be used in the practice of the invention include one or more of sulfur based curatives, peroxide curatives, resin cure, hydrosilation, labile or migratory cure systems, and high energy radiation. Such curing systems are well known in the art.

When using a chemical curing agent, such as sulfur, sulfur donors, peroxides, and resins, to induce the reaction, the curing agent is generally mixed into the propylene-based elastomer, or the blend comprising the elastomer, prior to the fabrication of the final shape of the article to be made. In a preferred embodiment, the curing process may be initiated after fabrication of the article by heating or other curing initiation step as would be familiar to those skilled in the art. When using an external agent, such as high-energy radiation, to induce the reaction, the propylene-based elastomer, or the blend comprising the elastomer, is fabricated into the final shape of the article to be made prior to contact with the external agent.

Propylene-Based Elastomer

The propylene-based elastomer of the present invention is a random propylene homopolymer or copolymer having crystalline regions interrupted by non-crystalline regions. The non-crystalline regions may result from regions of non-crystallizable polypropylene segments and/or the inclusion of comonomer units. The crystallinity and the melting point of the propylene-based elastomer are reduced compared to highly isotactic polypropylene by the introduction of errors in the insertion of propylene and/or by the presence of comonomer.

The crystallinity of the propylene-based elastomer may be expressed in terms of heat of fusion. In particular embodiments, the propylene-based elastomer has a heat of fusion, as determined by DSC, ranging from a lower limit of 1.0 J/g, or 1.5 J/g, or 3.0 J/g, or 4.0 J/g, or 6.0 J/g, or 7.0 J/g, to an upper limit of 30 J/g, or 40 J/g, or 50 J/g, or 60 J/g, or 75 J/g.

The crystallinity of the propylene-based elastomer can also be expressed in terms of crystallinity percent. The thermal energy for the highest order of polypropylene is estimated at 189 J/g. That is, 100% crystallinity is equal to 189 J/g. Therefore, in particular embodiments, the propylene-based elastomer has a propylene crystallinity within the range having an upper limit of 65%, or 40%, or 30%, or 25%, or 20%, and a lower limit of 1%, or 3%, or 5%, or 7%, or 8%.

The level of crystallinity is also reflected in the melting point. The term "melting point," as used herein is the highest peak among principal and secondary melting peaks, as determined by DSC. In particular embodiments, the propylene-based elastomer has a melting point by DSC ranging from an upper limit of 110° C., or 105° C., or 90° C., or 80° C., or 70° C. to a lower limit of 0° C., or 20° C., or 25° C., or 30° C., or 35° C., or 40° C., or 45° C.

The propylene-based elastomer generally comprises at least 60 wt % propylene-derived units, and in particular embodiments, the propylene-based elastomer comprises at least 75 wt %, or at least 80 wt %, or at least 90 wt % propylene-derived units.

Propylene-based elastomers suitable in the present invention have an isotactic propylene triad tacticity within the range having a lower limit of 65%, or 70%, or 75% to an upper limit of 95%, or 97%, or 98%, or 99%. The isotactic propylene triad tacticity of a polymer is the relative tacticity of a sequence of three adjacent propylene units, a chain consisting of head to tail bonds, expressed as a binary combination of m and r sequences. The isotactic propylene triad tacticity of the polymers disclosed herein was determined using $C^{13}$NMR and the calculations outlined in U.S. Pat. No. 5,504,172.

In particular embodiments, the propylene-based elastomer of the invention has an isotacticity index greater than 0%, or within the range having an upper limit of 50%, or 25% and a lower limit of 3%, or 10%.

In particular embodiments, the propylene-based elastomer of the invention has a tacticity index (m/r) within the range having an upper limit of 8, or 10, or 12, and a lower limit of 4, or 6.

In particular embodiments, the propylene-based elastomer of the invention has a Melt Flow Rate (MFR) at 230° C. of from 0.1 to 400, or from 3 to 200, or from 5 to 150, prior to crosslinking.

In particular embodiments, the propylene-based elastomer has a tension set after 200% elongation of less than 50%. In a particular aspect of this embodiment, the propylene-based elastomer has an ultimate tensile strength of 1500 psi (10.4 MPa) or greater, or 1000 psi (6.9 MPa) or greater, or 500 psi (3.5 MPa) or greater.

In some embodiments, the crystallinity of the propylene-based elastomer is controlled by the copolymerization of propylene with limited amounts of one or more comonomers selected from: ethylene, $C_4$-$C_{20}$ alpha-olefins, and polyenes. In these copolymers, the amount of propylene-derived units present in the propylene-based elastomer ranges from an upper limit of 99.9 wt %, or 97 wt %, or 95 wt %, or 94 wt %, or 92 wt %, or 90 wt %, or 85 wt % to a lower limit of 60 wt %, 68 wt %, or 70 wt %, or 71 wt %, or 75 wt %, or 76 wt %, or 80 wt %, based on the total weight of the propylene-based elastomer. The amount of optional units derived from ethylene and/or $C_4$-$C_{20}$ alpha-olefins present in the propylene-based elastomer ranges from an upper limit of 40 wt %, or 35 wt %, or 30 wt %, or 28 wt %, or 25 wt %, or 20 wt %, or 15 wt % to a lower limit of 0 wt %, or 0.5 wt %, or 1 wt %, or 2 wt %, or 3 wt %, or 5 wt %, or 6 wt %, or 8 wt %, or 10 wt %, based on the total weight of the propylene-based elastomer. The amount of optional polyene-derived units present in the propylene-based elastomer ranges from an upper limit of 25 wt %, or 20 wt %, or 15 wt %, or 10 wt %, or 7 wt %, or 6 wt %, or 5 wt %, or 4.5 wt %, or 3 wt %, or 2.5 wt %, to a lower limit of 0 wt %, or 0.1 wt %, or 0.2 wt %, or 0.3 wt %, or 0.5 wt %, or 1 wt %, or 1.5 wt % based on the total weight of the propylene-based elastomer.

Non-limiting examples of preferred α-olefin(s) optionally present in the propylene-based elastomer include propylene, 1-butene, 1-pentene, 1-hexene, 1-octene, and 1-dodecene. The polyene-derived units optionally present in the propylene-based elastomer may be derived from any hydrocarbon structure having at least two unsaturated bonds wherein at least one of the unsaturated bonds may be incorporated into a polymer. Non-limiting examples of preferred polyenes include 5-ethylidene-2-norbornene ("ENB"), 5-vinyl-2-norbornene ("VNB"), divinyl benzene ("DVB"), and dicyclopentadiene ("DCPD").

In a particular embodiment, the propylene-based elastomer has a Mooney viscosity ML(1+4) at 125° C. of from 0.5 to 100, or from 5 to 40, or from 10 to 40.

The propylene-based elastomer of the invention has a weight average molecular weight ($M_w$) within the range having an upper limit of 5,000,000 g/mol, or 1,000,000 g/mol, or 500,000 g/mol, and a lower limit of 10,000 g/mol, or 15,000 g/mol, or 20,000 g/mol, or 80,000 g/mol, and a molecular weight distribution $M_w/M_n$ (MWD), sometimes referred to as a "polydispersity index" (PDI), within the range having an upper limit of 40, or 20, or 10, or 5, or 4.5, or 4.0, or 3.2, or 3.0, and a lower limit of 1.5, or 1.8, or 2.0.

Illustrative non-limiting examples of suitable propylene-based elastomers, as well as the methods for preparing them, include the "FPC" disclosed in pending U.S. Provisional Patent Application No. 60/519,975; the "isotactic propylene copolymer" disclosed in U.S. Patent Application Publication No. 2003/0204017; the "propylene ethylene copolymers" disclosed in U.S. Pat. No. 6,525,157; and the "propylene ethylene copolymers" disclosed in PCT Publication No. WO02/083754, the disclosures of which are hereby fully incorporated herein by reference.

Separate from, or in combination with the foregoing, the crystallinity of the propylene-based elastomer can be reduced also by stereo-irregular incorporation of the propylene-derived units, which can be influenced by, for example, the choice of catalyst and polymerization temperature.

The propylene-based elastomers of the present invention are not limited by any particular polymerization method of preparation, and the polymerization processes described herein are not limited by any particular type of reaction vessel.

In a particular embodiment, the catalyst system used to produce the propylene-based elastomer includes one or more transition metal compounds and one or more activators. When alumoxane or aluminum alkyl activators are used, the combined pre-catalyst-to-activator molar ratio is generally from 1:5000 to 10:1. When ionizing activators are used, the combined pre-catalyst-to-activator molar ratio is generally from 10:1 to 1:10. Multiple activators may be used, including using mixtures of alumoxanes or aluminum alkyls with ionizing activators.

In another particular embodiment, the catalyst system includes a bis(cyclopentadienyl) metal compound and either (1) a non-coordinating compatible anion activator, or (2) an alumoxane activator. Non-limiting examples of catalyst systems which can be used are described in U.S. Pat. Nos. 5,198,401 and 5,391,629, which are hereby incorporated herein by reference.

In another embodiment, the propylene-based elastomer is made in the presence of an activating cocatalyst which is a precursor ionic compound comprising a halogenated tetraaryl-substituted Group 13 anion wherein each aryl substituent contains at least two cyclic aromatic rings. In a particular aspect of this embodiment, the propylene-based elastomer contains greater than 0.2 parts per million, or greater than 0.5 parts per million, or greater than 1 part per million, or greater than 5 parts per million of the residues of the activating cocatalyst.

In another particular embodiment, the catalyst system used to produce the propylene-based elastomer includes a Hf-containing metallocene catalyst, such as but not limited to dimethyl silyl bis(indenyl) hafnium dimethyl, and a non-coordinating anion activator, such as but not limited to dimethyl anilinium tetrakis(heptafluoronaphthyl) borate.

In yet another particular embodiment, the propylene-based elastomer is produced using any of the catalyst systems and polymerization methods disclosed in U.S. Patent Application Publication 2004/0024146, the disclosure of which is hereby incorporated herein by reference.

In yet another particular embodiment, the propylene-based elastomer is produced using a catalyst system such as one of the nonmetallocene, metal-centered, heteroaryl ligand catalyst systems described in U.S. Patent Application Publication 2003/0204017, the disclosure of which is hereby incorporated herein by reference.

Further general process condition information suitable for use in preparing the propylene-based elastomer can be found in disclosures including, but not limited to U.S. Pat. No. 5,001,205 and PCT publications WO96/33227 and WO97/22639. Further information on gas phase polymerization processes can be found in disclosures including, but not limited to U.S. Pat. Nos. 4,543,399; 4,588,790; 5,028,670; 5,317,036; 5,352,749; 5,405,922; 5,436,304; 5,453,471; 5,462,999; 5,616,661; 5,627,242; 5,665,818; 5,668,228; and 5,677,375, and European publications EP-A-0 794 200; EP-A-0 802 202; and EP-B-634 421. Information relating to methods of introducing liquid catalyst systems into fluidized bed polymerizations into a particle lean zone can be found in disclosures including, but not limited to U.S. Pat. No. 5,693,727. Further information on slurry polymerization processes can be found in disclosures including, but not limited to U.S. Pat. Nos. 3,248,179 and 4,613,484. PCT publication WO 96/08520 and U.S. Pat. No. 5,712,352 are non-limiting examples of disclosures which describe a polymerization process operated in the absence of or essentially free of any scavengers.

In embodiments of the invention including a composition comprising the propylene-based elastomer, the propylene-based elastomer is present in an amount of at least 50 wt %, or at least 60 wt %, or at least 70 wt %, or at least 75 wt %, or at least 80 wt %, or at least 95 wt %, based on the total weight of the composition.

In another embodiment of the invention including a composition comprising the propylene-based elastomer, the ratio of the total weight of the crystalline polymer component, fillers, pigments, and plasticizers, etc. (i.e., the total weight of the materials other than the propylene-based elastomer) to the weight of the propylene-based elastomer is 2 or less, or 1.5 or less, or 1.3 or less, or 1 or less, or 0.5 or less, or 0.3 or less, or 0.2 or less.

Crystalline Polymer Component

Some embodiments of the invention include a crystalline propylene polymer component. The crystalline polymer component may be selected from: propylene homopolymer, propylene copolymer, and mixtures thereof which are commonly known as reactor copolymers or impact copolymers. In embodiments where the crystalline polymer component includes a propylene copolymer, the propylene copolymer may be a graft copolymer, block copolymer, or random copolymer.

The amount of propylene-derived units present in the crystalline polymer component is 90 wt % or higher, or 92 wt % or higher, or 95 wt % or higher, or 97 wt % or higher, or 100 wt %, based on the total weight of the crystalline polymer component.

In one embodiment, the crystalline polymer component includes a random copolymer of propylene and at least one comonomer selected from one or more of: ethylene and $C_4$-$C_{12}$ alpha-olefins. In a particular aspect of this embodiment, the amount of comonomer is within the range having an upper limit of 9 wt %, or 8 wt %, or 6 wt %, and a lower limit of 2 wt %, based on the total weight of the crystalline polymer component.

The crystalline polymer component of the invention has a melting point by DSC of at least 110° C., or at least 115° C., or at least 130° C., and a heat of fusion, as determined by DSC, of at least 60 J/g, or at least 70 J/g, or at least 80 J/g.

The crystalline polymer component of the invention has a weight average molecular weight ($M_w$) within the range having an upper limit of 5,000,000 g/mol, or 500,000 g/mol, and a lower limit of 10,000 g/mol, or 50,000 g/mol, and a molecular weight distribution $M_w/M_n$ (MWD), sometimes referred to as a "polydispersity index" (PDI), within the range having an upper limit of 40 and a lower limit of 1.5.

The invention is not limited by any particular method for preparing the crystalline polymer component. In one embodiment, the crystalline polymer component may be a propylene homopolymer obtained by a well known process for the homopolymerization of propylene in a single stage or multiple stage reactor. In another embodiment, the crystalline polymer component may be a propylene copolymer obtained by a well known process for copolymerizing propylene and one or more comonomers in a single stage or multiple stage reactor.

Polymerization methods for preparing the crystalline polymer component include high pressure, slurry, gas, bulk, solution phase, and combinations thereof. Catalyst systems that can be used include traditional Ziegler-Natta catalysts and single-site metallocene catalyst systems. In one embodiment, the catalyst used has a high isospecificity.

Polymerization of the crystalline polymer component may be carried out by a continuous or batch process and may include the use of chain transfer agents, scavengers, or other such additives well known to those skilled in the art. The crystalline polymer component may also contain additives such as flow improvers, nucleators, and antioxidants which are normally added to isotactic polypropylene to improve or retain properties.

Blends

In one embodiment, the invention provides a blend composition comprising at least one propylene-based elastomer, and at least one crystalline polymer component. Such blend compositions have a heterogeneous phase morphology consisting of domains of different crystallinities. These domains of different crystallinities differentiate the inventive compositions from commonly available propylene reactor copolymers (i.e., blends of isotactic polypropylene and copolymers of propylene and ethylene), which have a single crystalline phase.

In the preferred embodiment, the continuous phase of the heterogeneous blend compositions has amorphous or crystallizable morphology, and contains the propylene-based elastomer and may contain minor amounts of the crystalline polymer component. The dispersed phase has crystalline morphology, and contains the crystalline polymer component, optional fillers, and may also contain propylene-based elastomer in small amounts relative to the continuous phase. The propylene-based elastomer has low crystallinity relative to the crystalline polymer component; therefore, the continuous phase of the inventive compositions has low crystallinity relative to the dispersed phase. The low crystallinity continuous phase differentiates the most preferred embodiments of the inventive compositions from commonly available propylene impact copolymers, thermoplastic elastomers, thermoplastic vulcanizates, and thermoplastic olefins, which have a highly crystalline continuous phase.

The components of the blend compositions should be selected to be compatible preferably to the extent that it is not be necessary to add preformed or in-situ formed compatibilizer to attain and retain a fine blend morphology.

The domains of the dispersed phase of the preferred heterogeneous blend compositions described herein are small with an average minimum axis of less than 5 μm. The larger axis of the dispersed phase can be as large as 100 μm.

Additives

As will be evident to those skilled in the art, the compositions of the present invention may comprise additives in addition to the polymer components. Various additives may be present to enhance a specific property or may be present as a result of processing of the individual components. Additives which may be incorporated include, but are not limited to processing oils, fire retardants, antioxidants, plasticizers, pigments, vulcanizing or curative agents, vulcanizing or curative accelerators, cure retarders, processing aids, flame retardants, tackifying resins, flow improvers, and the like. Antiblocking agents, coloring agents, lubricants, mold release agents, nucleating agents, reinforcements, and fillers (including granular, fibrous, or powder-like) may also be employed. Nucleating agents and fillers may improve the rigidity of the article. The list described herein is not intended to be inclusive of all types of additives which may be employed with the present invention. Those of skill in the art will appreciate that other additives may be employed to enhance properties of the composition. As is understood by those skilled in the art, the compositions of the present invention may be modified to adjust the characteristics of the blend as desired.

The compositions described herein may also contain inorganic particulate fillers, which may improve the mechanical and wear properties of the compositions, particularly in compositions including cured components. The amount of inorganic filler used is typically from 1 to 100 parts by weight of inorganic filler per 100 parts of polymeric material. The inorganic fillers include particles less than 1 mm in diameter, rods less than 1 cm in length, and plates less than 0.2 cm$^2$ in surface area. Exemplary particulate fillers include talc, clays, titanium and magnesium oxides, and silica. Carbon black will typically not be preferred, as it interferes with desired optical properties. In addition, other particulate fillers, such as calcium carbonate, zinc oxide, whiting, and magnesium oxide, can also be used. An example of a rod-like filler is glass fiber. An example of a plate-like filler is mica. The addition of very small particulate fibers, commonly referred to as nanocomposites, is also contemplated. The addition of the fillers may change the properties of the compositions described herein. For example, compositions including inorganic filler can yield improved thermal stability and resistance to wear.

The amount and choice of filler is limited to those combinations which do not compromise the transparency of the crosslinked article. Typically, the addition of fillers leads to loss of clarity due to obstruction of the passage of light through polymer samples including filler. Several methods are available for inducing clarity in the presence of filler including (a) the use of fillers whose linear dimensions are comparable to or smaller than the wavelength of visible light, (b) the use of transparent fillers whose refractive index is similar to the propylene-based elastomer, and (c) using the minimum allowable amount of filler or pigment. In various embodiments of the invention, one or more of these procedures may be used to maintain clarity of the inventive compositions.

The compositions described herein may contain process oil in the range of from 0 to 500 parts by weight, or from 2 to 200 parts by weight, or from 5 to 150 parts by weight, or from 10 to 100 parts by weight or from 20 to 50 parts by weight, per hundred parts of total polymer. The addition of process oil in moderate amounts may lower the viscosity and flexibility of the blend while improving the properties of the blend at temperatures near and below 0° C. It is believed that these potential benefits arise by the lowering of the glass transition temperature (Tg) of the blend. Adding process oil to the blend may also improve processability and provide a better balance of elastic and tensile strength. The process oil is typically known as extender oil in rubber applications. Process oils include hydrocarbons having either (a) traces of hetero atoms such oxygen or (b) at least one hetero atom such as dioctyl plithalate, ethers, and polyethers. Process oils have a boiling point to be substantially involatile at 200° C. These process oils are commonly available either as neat solids, liquids, or as physically absorbed mixtures of these materials on an inert support (e.g., clay, silica) to form a free flowing powder. Process oils usually include a mixture of a large number of chemical compounds which may consist of linear, acyclic but branched, cyclic, and aromatic carbonaceous structures. Another family of process oils are certain organic esters and alkyl ether esters having a molecular weight (Mn) less than 10,000. Combinations of process oils may also be used in the practice of the invention. The process oil should be compatible or miscible with the polymer blend composition in the melt, and may be substantially miscible in the propylene-based elastomer at room temperature. Process oils may be added to the blend compositions by any of the conventional means known in the art, including the addition of all or part of the process oil prior to recovery of the polymer, and addition of all or part of the process oil to the polymer as a part of a compounding for the interblending of the propylene-based elastomer. The compounding step may be carried out in a batch mixer, such as a mill, or an internal mixer, such as a Banbury mixer. The compounding operation may also be conducted in a continuous process, such as a twin screw extruder. The addition of process oils to lower the glass transition temperature of blends of isotactic polypropylene and ethylene propylene diene rubber is described in U.S. Pat. Nos. 5,290,886 and 5,397,832, the disclosures of which are hereby incorporated herein by reference.

As used herein, the term "process oil" also includes certain hydrocarbon resins, which are selected to be miscible with the polymer. The resins are miscible if they meet the following criteria. In a differential scanning calorimetry (DSC) experiment, a polymer composition shows a single glass transition temperature (Tg1) between 20° C. and −50° C.; a corresponding polymer blend containing the polymer composition and hydrocarbon resin also shows a single glass transition temperature (Tg2); and Tg2 is higher than Tg1 by at least 1° C. The resins useful as process oil in the present invention preferably have a glass transition temperature, by DSC, of 20° C. or greater.

Hydrocarbon resins useful in embodiments of the present invention have a softening point within the range having an upper limit of 180° C., or 150° C., or 140° C., and a lower limit of 80° C., or 120° C., or 125° C. The softening point (° C.) is measured as a ring and ball softening point according to ASTM E-28 (Revision 1996).

In a particular embodiment, the blends of the present invention include a hydrocarbon resin in an amount ranging from a lower limit of 1%, or 5%, or 10% by weight, based on the total weight of the blend, to an upper limit of 30%, or 25%, or 20%, by weight, based on the total weight of the blend.

Various types of natural and synthetic resins, alone or in admixture with each other, can be used in preparing the compositions described herein. Suitable resins include, but are not limited to, natural rosins and rosin esters, hydrogenated rosins and hydrogenated rosin esters, coumarone-indene resins, petroleum resins, polyterpene resins, and terpene-phenolic resins. Specific examples of suitable petroleum resins include, but are not limited to aliphatic hydrocarbon resins, hydrogenated aliphatic hydrocarbon resins, mixed aliphatic and aromatic hydrocarbon resins, hydrogenated mixed aliphatic and aromatic hydrocarbon resins, cycloaliphatic hydrocarbon resins, hydrogenated cycloaliphatic resins, mixed cycloaliphatic and aromatic hydrocarbon resins, hydrogenated mixed cycloaliphatic and aromatic hydrocarbon resins, aromatic hydrocarbon resins, substituted aromatic hydrocarbons, hydrogenated aromatic hydrocarbon resins. As used herein, hydrogenated includes fully, substantially and at least partially hydrogenated resins. Suitable aromatic resins include aromatic modified aliphatic resins, aromatic modified cycloaliphatic resin, and hydrogenated aromatic hydrocarbon resins having an aromatic content of 1-30%, preferably 1-20%, more preferably 1-5%, and even more preferably less than 1 wt %. Any of the above resins may be grafted with an unsaturated ester or anhydride to provide enhanced properties to the resin. Examples of grafted resins and their manufacture are described in PCT Applications PCT/EP02/10794, PCT/EP02/10795, PCT/EP02/10796, and PCT/EP02/10686, which are incorporated herein by reference for U.S. purposes. For additional description of resins, reference can be made to technical literature, e.g., Hydrocarbon Resins, Kirk-Othmer, *Encyclopedia of Chemical Technology*, 4th Ed. v. 13, pp. 717-743 (J. Wiley & Sons, 1995).

Illustrative, non-limiting examples of suitable resins include EMPR 100, 101, 102, 103, 104, 105, 106, 107, 108, 109, 110, 116, 117, and 118 resins, and EMFR resins, available from ExxonMobil Chemical Company. The preceding examples are illustrative only and by no means limiting. Embodimets of the present invention include resins having a molecular weight (Mn) less than that of the polymer. Preferably, the resin has a molecular weight (Mn) within the range having an upper limit of 1000 and a lower limit of 500.

The addition of process aids, such as a mixture of fatty acid ester or calcium fatty acid soap bound on a mineral filler, to the compositions described herein may help the mixing of the composition and the injection of the composition into a mold. Other examples of process aids are low molecular weight polyethylene copolymer wax and paraffin wax. The amount of process aid used may be within the range of from 0.5 to 5 parts by weight per 100 parts of polymer.

Adding antioxidants to the compositions described herein may improve the long term aging. Examples of antioxidants include, but are not limited to quinolein, e.g., trimethylhydroxyquinolein (TMQ); imidazole, e.g., zincmercapto toluyl imidazole (ZMTI); and conventional antioxidants, such as hindered phenols, lactones, and phosphites. The amount of antioxidants used may be within the range of from 0.001 to 5 parts by weight per 100 parts of polymer.

Treatment and Use of Blend

We have discovered that optical properties of the blends can be improved by post blend treatment. In many embodiments, heating the blend can markedly improve the clarity. This heating can be done as part of the blending process or subsequent to the blending process. Preferably, it is done as part of the crosslinking step, when thermally activated crosslinking agents are employed. For example, when crystalline polypropylene is used as the crystalline polymer component of the blend (preferably, for example, Achieve 3854 available from ExxonMobil Chemical Company of Houston, Tex.) we have found that heating the blend to at least 170° C. either during or following the crosslinking step greatly improves clarity. More specifically, we have found that it is beneficial to raise the temperature to a level such that the crystalline polymer component is substantially entirely melted. Preferably, the temperature is raised to at least the temperature at which 99% of the melting has occurred in the DSC thermogram. Those skilled in the art will appreciate that lower temperatures can be used in some applications with negligible or modest diminution in clarity. In some cases, 95% or 90% melting will suffice.

While not wishing to be bound by theory, we believe that raising the temperature of the blend to about or above the melting point of the crystalline polymer yields considerable decrease in the crystal size of the crystalline polypropylene, within the propylene based elastomer matrix, thus imparting a great increase in clarity. In some applications this heating step will best be performed during forming of the finished article. In other applications it may be desirable to form the article and then conduct this heating step after the article is formed. We also believe that certain additives, especially polycyclic polymers such as EMPR 100 or 103, available from ExxonMobil Chemical Company of Houston, Tex., can improve clarity properties of the finished blend. They can be used in an amount equal to 10 to 500 wt % of the crystalline polymer component, most preferably 10 to 50 wt % of the crystalline polymer component.

Definitions and Test Methods

Comonomer content: The comonomer content and sequence distribution of the polymers can be measured using $^{13}$C nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, vol. 47, pp. 1128-1130.

In the particular case of propylene-ethylene copolymers containing greater than 75 wt % propylene, the comonomer content can be measured as follows. A thin homogeneous film is pressed at a temperature of about 150° C. or greater, and mounted on a Perkin Elmer PE 1760 infrared spectrophotometer. A full spectrum of the sample from 600 cm$^{-1}$ to 4000 cm$^{-1}$ is recorded and the monomer weight percent of ethylene can be calculated according to the following equation: Ethylene wt %=82.585−111.987X+30.045X$^2$, where X is the ratio of the peak height at 1155 cm$^{-1}$ and peak height at either 722 cm$^{-1}$ or 732 cm$^{-1}$, whichever is higher.

Polyene content: The amount of polyene present in a polymer can be inferred by the quantitative measure of the amount of the pendant free olefin present in the polymer after polymerization. Several procedures such as iodine number and the determination of the olefin content by H$^1$ or $^{13}$C nuclear magnetic resonance (NMR) have been established. In embodiments described herein where the polyene is ENB, the amount of polyene present in the polymer can be measured using ASTM D3900.

Isotactic: The term "isotactic" is defined herein as a polymer sequence in which greater than 50% of the pairs of pendant methyl groups located on adjacent propylene units, which are inserted into the chain in a regio regular 1,2 fashion and are not part of the backbone structure, are located either above or below the atoms in the backbone chain, when such atoms in the backbone chain are all in one plane. Certain combinations of polymers in blends or polymer sequences within a single polymer are described as having "substantially the same tacticity," which herein means that the two polymers are both isotactic according to the definition above.

Tacticity: The term "tacticity" refers to the stereoregularity of the orientation of the methyl residues from propylene in a polymer. Pairs of methyl residues from contiguous propylene units identically inserted which have the same orientation with respect to the polymer backbone are termed "meso" (m). Those of opposite configuration are termed "racemic" (r). When three adjacent propylene groups have methyl groups with the same orientation, the tacticity of the triad is 'mm'. If two adjacent monomers in a three monomer sequence have the same orientation, and that orientation is different from the relative configuration of the third unit, the tacticity of the triad is 'mr'. When the middle monomer unit has an opposite configuration from either neighbor, the triad has 'rr' tacticity. The fraction of each type of triad in the polymer can be determined and when multiplied by 100 indicates the percentage of that type found in the polymer.

The triad tacticity of the polymers described herein can be determined from a $^{13}C$ nuclear magnetic resonance (NMR) spectrum of the polymer as described below and as described in U.S. Pat. No. 5,504,172, the disclosure of which is hereby incorporated herein by reference.

Tacticity Index: The tacticity index, expressed herein as "m/r", is determined by $^{13}C$ nuclear magnetic resonance (NMR). The tacticity index m/r is calculated as defined in H. N. Cheng, *Macromolecules,* 17, 1950 (1984). An m/r ratio of 1.0 generally describes a syndiotactic polymer, and an m/r ratio of 2.0 generally describes an atactic material. An isotactic material theoretically may have a ratio approaching infinity, and many by-product atactic polymers have sufficient isotactic content to result in ratios of greater than 50.

Melting point and heat of fusion: The melting point (Tm) and heat of fusion of the polymers described herein can be determined by Differential Scanning Calorimetry (DSC), using the ASTM E-794-95 procedure. About 6 to 10 mg of a sheet of the polymer pressed at approximately 200° C. to 230° C. is removed with a punch die and annealed at room temperature for 48 hours. At the end of this period, the sample is placed in a Differential Scanning Calorimeter (Perkin Elmer Pyris Analysis System and cooled to about −50° C. to −70° C. The sample is heated at about 20° C./min to attain a final temperature of about 180° C. to 200° C. The term "melting point," as used herein, is the highest peak among principal and secondary melting peaks as determined by DSC, discussed above. The thermal output is recorded as the area under the melting peak of the sample, which is typically at a maximum peak at about 30° C. to about 175° C. and occurs between the temperatures of about 0° C. and about 200° C. The thermal output is measured in Joules as a measure of the heat of fusion. The melting point is recorded as the temperature of the greatest heat absorption within the range of melting of the sample.

Molecular weight and molecular weight distribution: The molecular weight and molecular weight distribution of the polymers described herein can be measured as follows. Molecular weight distribution (MWD) is a measure of the range of molecular weights within a given polymer sample. It is well known that the breadth of the MWD can be characterized by the ratios of various molecular weight averages, such as the ratio of the weight average molecular weight to the number average molecular weight, Mw/Mn, or the ratio of the Z-average molecular weight to the weight average molecular weight Mz/Mw.

Mz, Mw, and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyro gel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. The desired MWD function (e.g., Mw/Mn or Mz/Mw) is the ratio of the corresponding M values. Measurement of M and MWD is well known in the art and is discussed in more detail in, for example, Slade, P. E. Ed., *Polymer Molecular Weights Part II*, Marcel Dekker, Inc., NY, (1975) 287-368; Rodriguez, F., *Principles of Polymer Systems* 3rd ed., Hemisphere Pub. Corp., NY, (1989) 155-160; U.S. Pat. No. 4,540,753; Verstrate et al., *Macromolecules*, vol. 21, (1988) 3360; and references cited therein.

Tension set: Tension set can be measured according to the general ASTM D790 procedure by uniaxially deforming a sample to different elongations.

Stress relaxation: Stress relaxation can be measured using the following procedure. The sample is mounted on an Instron 4465 tester and elongated to 200% elongation. The load at this elongation is measured as L1. The sample is maintained at this extension for 30 seconds and the new load at the end of the 30 seconds is measured as $L1_{30}$. The relaxation (R1) of the film is measured as $100 \times (L1-L1_{30})/L1$, and is expressed as a percentage. The sample is returned to the initial elongation of 0%. The sample is then elongated to 200% elongation. The load at this elongation is measured as L2. The sample is maintained at this extension for 30 seconds and the new load at the end of the 30 seconds is measured as $L2_{30}$. The relaxation (R2) of the film is measured as $100 \times (L2-L2_{30})/L2$, and is expressed as a percentage. The sample is returned to the initial elongation of 0%. The elongation at which the load on the sample is zero on the second cycle is noted as the set %. The hysteresis in the sample is designated as $100 \times (L1-L2)/L1$, and is expressed as a percentage.

Stress strain measurements: The stress-strain elongation properties of the cured compounds described herein can be measured according to the ASTM D790 procedure described as follows. Dumbbell shaped samples were fabricated into a cured pad molded into dimensions of 6 in×6 in and removed with a die. The stress strain evaluation of the samples was conducted on an Instron 4465 tester determined for blends at 20 in/min, made by Instron Corporation of Canton, Mass. The digital data was collected in a file collected by the Series IX Material Testing System available from Instron Corporation and analyzed using Excel, a spreadsheet program available from Microsoft Corporation of Redmond, Wash.

PHR: The term "phr" is used herein to mean parts per hundred rubber or parts per hundred elastomeric polymer.

Extraction in refluxing xylene: Solubility in refluxing xylene is a measurement of the amount of insoluble and unextractible propylene-based elastomer and optional ethylene-based polymer in compositions containing cured propylene-based elastomer and cured ethylene-based polymer (if present). The process for determining solubility in xylene is as follows. A sample having a thin section, i.e., less than 0.5 in, and weighing approximately 2 grams is weighed, and the weight is recorded as $W_1$. The sample is exposed to 50 ml of refluxing xylene in an extraction apparatus. The temperature of the sample is maintained at or near 140° C. by the refluxing solvent. After 24 hours of extraction, the solvent is decanted off and 50 ml of new solvent is added and the extraction is conducted under identical conditions for another 24 hours. At the end of this period, the sample is removed and dried in a vacuum oven at 100° C. for 24 hours. The sample is then cooled and weighed for a final weight which is recorded as $W_2$. The fraction of the polymer insoluble in xylene at reflux is determined by the following formula: % crosslinked, by extraction=$100\times[W_2(1-F_{Fi})]/[W_1(1-F_S-F_P-F_{Fi})]$, where $F_S$ is the weight fraction of crystalline polymer component present in the composition, $F_P$ is the weight fraction of plasticizer, process oil, and other low molecular weight materials present in the composition which are extractible in refluxing xylene, and $F_{Fi}$ is the weight fraction of filler and other inorganic material present in the composition which are normally inextractible in refluxing xylene.

Die C tear strength: Die C tear properties are reported in lb force/in according to the ASTM D624 version 00 procedure. The data herein is for peak force and the average of three samples is reported as the average data. The original data may be multiplied by 0.175 to convert the units from lb force/in to kN/m.

Trouser tear: Trouser tear properties are reported in lb force/in according to the ASTM D624 version 00 procedure. The data herein is for peak force and the average of three samples is reported as the average data. The original data may be multiplied by 0.175 to convert the units from lb force/in to kN/m.

Mooney viscosity: Mooney viscosity, as used herein, is measured as ML(1+4)@125° C. according to ASTM D1646.

Melt flow rate and melt index The determination of the Melt Flow rate (MFR) and the Melt Index of the polymer is according to ASTM D1238 using modification 1 with a load of 2.16 kg. In this version of the method a portion of the sample extruded during the test was collected and weighed. The sample analysis is conducted at 230° C. with a 1 minute preheat on the sample to provide a steady temperature for the duration of the experiment. This data expressed as dg of sample extruded per minute is indicated as MFR. In an alternative procedure, the test is conducted in an identical fashion except at a temperature of 190 C. This data is referred to as MI@190C. As used herein, MFR@230° C. refers to the MFR of the composition comprising the propylene-based elastomer, optional crystalline polymer component, and optional additives other than curative additives prior to crosslinking.

Shore A and Shore D hardness The determination of the Shore A and Shore D hardness of the polymer is according to ASTM D 2240. In this version of the method a portion of the sample is tested at room temperature. The data is recorded 15 seconds after the indentation is created in the sample. As used herein, Shore A hardness is the Shore A hardness of the crosslinked composition.

Isotacticity Index: The isotacticity index is calculated according to the procedure described in EP 0374695A2. The IR spectra of a thin film of the material is recorded and the absorbance at 997 $cm^{-1}$ and the absorbance at 973 $cm^{-1}$ are determined. The quotient of the absorbance at 997 $cm^{-1}$ to the absorbance at 973 $cm^{-1}$ is multiplied by 100 to yield the isotacticity index. In the determination of the absorbance at these two positions the position of zero absorbance is the absorbance when there is no analytical sample present in the sample beam.

Viscosity ratio: Rheological experiments were performed on the samples before and after irradiation. Experiments were performed on a Rheomterics ARES Rheometer using parallel plate geometry using 25 mm diameter plates. Small amplitude oscillatory shear measurements were performed at 190° C. and 20% strain from 0.1 to 100 rad/s. The ratio of the viscosity of the samples at 0.1 rad/s after radiation to that before radiation is taken to be the viscosity ratio.

Haze: Haze was measured on a compression molded plaque of the compound approximately 50 to 90 thousandths of an inch thick. Haze is expressed as a percentage and is measured on a Hazegard Plus Hazemeter, with a CIE Illuminant C light source according to the procedure of ASTM D1003-00.

Thickness: Thickness was measured with a hand-held micrometer and is expressed as mils or thousandths of an inch.

RPA measurement: Cure characteristics (torque and loss factor) were measured using an RPA 2000 (Rubber Processing Analyzer) from Alpha Technologies, Akron, Ohio. About 5.5 g of compound were weighted and place between two thin Mylar films and placed between the RPA die plates. The measurements were carried out as a function of time at several constant temperatures, in steps of 10° C. The temperature ranges from 140 to 210° C., depending on the cure package used. Strain was set to 13.95% and frequency to 1 Hz. The samples were first conditioned for 1 minute at the selected temperature and data collection lasted for 1 hour. The output of the measurement consisted of the torque (S'), the modulus and the loss factor (tan δ) of the compound as a function of time which were then stored for further processing and analysis.

EXAMPLES

Sunpar 150 is a process oil available from Sunoco Inc, Philadelphia, Pa.

Translink 37 is a surface treated kaolin clay from Engelhard Corporation, Iselin, N.J.

EMPR 103 and EMPR 100 are hydrocarbon resins commercially available from ExxonMobil Chemical Co., Houston, Tex.

Dicumyl peroxide (DiCup R) and triallyl cyanourate (TAC) are commercially available from Aldrich Chemical Co., Milwaukee, Wis.

ESC PP 4292 (3 MFR), ESC Achieve 3854 (34 MFR), ESC PP 3155 (35 MFR), ESC 100 MFR (100 MFR), ESC PP 3505

(400 MFR), and PP Achieve 3936 (100 MFR) are isotactic polypropylenes having the given MFR and are available from ExxonMobil Chemical Co., Houston, Tex.

V2504, V3666, and V404 are ethylene-propylene copolymers commercially available from ExxonMobil Chemical Co., Houston, Tex.

Irganox 1076 is an antioxidant available from Novartis Corporation.

HVA-2 is a curing coagent available from E.I. DuPont de Nemours, Wilmington, Del.

SHF 101 is a synthetic oil available from ExxonMobil Chemical Co., Houston, Tex.

The propylene-based elastomers in the following examples can be prepared according to the following procedure. In a 27 liter continuous flow stirred tank reactor equipped with a dual pitch blade turbine agitator, 92 Kg of dry hexane, 34 Kg of propylene, 1.8 Kg of ethylene, 1.1 Kg of 5-ethylidene-2-norbornene (ENB) are added per hour. The reactor is agitated at 650 rpm during the course of the reaction and is maintained liquid full at 1600 psi pressure (gauge) so that all regions in the polymerization zone have the same composition during the entire course of the polymerization. A catalyst solution in toluene of 1.5610-3 grams of dimethylsilylindenyl dimethyl hafnium and 2.4210-3 grams of dimethylanilinium tetrakis (heptafluoronaphthyl) borate are added at a rate of 6.35 ml/min to initiate the polymerization. An additional solution of tri-n-octyl aluminum (TNOA) is added to remove extraneous moisture during the polymerization. The polymerization is conducted at approximately 59° C. and the temperature is maintained during the polymerization by adding pre-chilled hexane at a temperature between −3° C. and 2° C. The polymerization typically leads to the formation of 9.5 Kg of polymer per hour. The polymer is recovered by two stage removal of the solvent, first by removing 70% of the solvent using a lower critical solution process as described in WO0234795A1, and then removing the remaining solvent in a LIST devolatization extruder. The polymer is recovered as pellets of about ⅛ to ¼ inch in principal axes.

Example 1

A propylene-based elastomer containing 13.5 wt % ethylene, 2.1 wt % 5-ethylidene-2-norbornene (ENB), and having an MFR@230° C. of 25 was prepared according to the procedure above and then blended with the ingredients according to Table 1 in an internal Brabender mixer operating at about 50 rpm at a temperature of about 100° C. The compound was then rolled out into a smooth sheet. The compounded material was then vulcanized at 150° C. for 100 minutes in the form of a 8"×8" compression molded pad with a thickness of 0.125". Samples of the appropriate geometry were removed from the vulcanized pad and analyzed. The results of the analysis are given in Table 1 below.

TABLE 1

|  | 1-1 | 1-2 | 1-3 | 1-4 | 1-5 | 1-6 | 1-7 | 1-8 |
|---|---|---|---|---|---|---|---|---|
| Materials Used | | | | | | | | |
| Propylene-based elastomer, g | 240 | 240 | 240 | 240 | 240 | 240 | 240 | 240 |
| DiCup R, g | 2.4 | 3.6 | 2.4 | 3.6 | 2.4 | 3.6 | 2.4 | 3.6 |
| HVA-2, g | 1.0 | 1.0 | 1.5 | 1.5 | 0 | 0 | 0 | 0 |
| TAC, g | 0 | 0 | 0 | 0 | 2.0 | 2.0 | 3.0 | 3.0 |
| RPA Measurements | | | | | | | | |
| temperature, ° C. | 160 | 160 | 160 | 160 | 160 | 160 | 160 | 160 |
| S' max, dNm | 1.76 | 2.62 | 1.95 | 2.83 | 2.28 | 3.21 | 2.59 | 3.62 |
| tan δ @ S' max | 0.223 | 0.142 | 0.221 | 0.142 | 0.152 | 0.101 | 0.136 | 0.092 |
| Properties | | | | | | | | |
| Tensile Elongation @20"/min, room temp | | | | | | | | |
| 50% strain, psi (MPa) | 318 | 298 | 318 | 297 | 291 | 285 | 306 | 269 |
|  | (2.19) | (2.05) | (2.19) | (2.05) | (2.01) | (1.97) | (2.11) | (1.85) |
| 100% strain, psi (MPa) | 365 | 345 | 362 | 341 | 333 | 333 | 350 | 317 |
|  | (2.52) | (2.38) | (2.50) | (2.35) | (2.30) | (2.30) | (2.41) | (2.19) |
| 200% strain, psi (MPa) | 391 | 375 | 388 | 372 | 358 | 365 | 376 | 357 |
|  | (2.70) | (2.59) | (2.68) | (2.56) | (2.47) | (2.52) | (2.59) | (2.46) |
| 500% strain, psi (MPa) | 558 | 552 | 590 | 580 | 512 | 542 | 564 | 581 |
|  | (3.85) | (3.81) | (4.07) | (4.00) | (3.53) | (3.74) | (3.89) | (4.01) |
| Ultimate Elongation, % | 891 | 875 | 867 | 846 | 872 | 840 | 860 | 736 |
|  | (6.14) | (6.03) | (5.98) | (5.83) | (6.01) | (5.79) | (5.93) | (5.07) |
| Ultimate Tensile, psi (MPa) | 1454 | 1432 | 1500 | 1460 | 1323 | 1424 | 1483 | 1204 |
|  | (10.0) | (9.9) | (10.3) | (10.1) | (9.1) | (9.8) | (10.2) | (8.3) |
| Die C Tear @ max load, room temp, lb force/in (kN/m) | 203 | 195 | 204 | 193 | 193 | 189 | 190 | 172 |
|  | (35.6) | (34.2) | (35.8) | (33.8) | (33.8) | (33.1) | (33.3) | (30.2) |
| Hardness initial, shore A | 70 | 65 | 67 | 67 | 68 | 71 | 70 | 70 |
| % crosslinked, by extraction | 95 | 99 | 89 | 90 | 99 | 98 | 97 | 98 |
| MFR@230° C. (exclusive of curatives) | 25 | 25 | 25 | 25 | 25 | 25 | 25 | 25 |
| Haze, % | 20.1 | 24.3 | 22.1 | 19.5 | 23.6 | 24.7 | 34.9 | 30.7 |
| Gauge Average, mils | 83.6 | 79.3 | 87.8 | 83.8 | 79.0 | 77.5 | 78.7 | 77.7 |
| Haze %/100 mil | 24.0 | 30.6 | 25.2 | 23.3 | 29.9 | 31.9 | 44.3 | 39.5 |

Example 2

Various propylene-based elastomers having the properties given in Table 2 were made according to the procedure above.

TABLE 2

| EXAMPLE | wt % C$_2$ | wt % ENB | MFR @230° C. | isotactity index (%) | heat of fusion (J/g) | Melting Point** (° C.) |
|---|---|---|---|---|---|---|
| 2-1 | 16.30 | 1.94 | 3.62 | 43 | 8.7 | 48 |
| 2-2 | 15.24 | 2.14 | 16.63 | 45 | 9 | 50 |
| 2-3 | 13.76 | 2.08 | 15.68 | 58 | 9 | 46/60 |
| 2-4 | 13.35 | 1.96 | 3.82 | 57 | 20.4 | 45/59 |
| 2-5 | 10.34 | 2.07 | 4.07 | 67 | 24.4 | 45/68 |
| 2-6 | 10.06 | 2.18 | 16.33 | 67 | 40.2 | 45/70 |
| 2-7 | 8.02 | 2.05 | 20.67 | 74 | 46.3 | 45/76 |
| 2-8 | 14.84 | 2.07 | 21.6 | 48 | * | * |
| 2-9 | 14.23 | 2.02 | 4.01 | 49 | * | * |
| 2-10 | 13.38 | 2.12 | 11.01 | 53 | * | * |
| 2-11 | 10.19 | 2.11 | 8.14 | 53 | * | * |
| 2-12 | 7.96 | 2.17 | 35.42 | 70 | * | * |
| 2-13 | 15.87 | 3.88 | 5.54 | 45 | * | * |
| 2-14 | 15.63 | 4.03 | 17.69 | 44 | * | * |
| 2-15 | 11.96 | 4.06 | 17.6 | 56 | 22.0 | 46/50 |
| 2-16 | 10.50 | 4.02 | 19.97 | 67 | * | * |

* not measured
**Where two numbers are given for the melting point, the first number represents the primary or largest melting peak, and the second number represents the secondary melting peak.

Example 3

Certain propylene-based elastomers from Example 2 were vulcanized according to the formulations given in Table 3-1 and 3-2 using the following procedure. The polymer was first mixed with the plasticizer and the filler at a temperature of approximately 135 to 145° C. for 10 minutes in a Brabender internal mixer having an internal capacity of about 280 ml. 40 g of the mixture of the polymer and plasicizer was removed for the determination of MFR. The remainder of the mixture was cooled and mixed with the curatives at a temperature not to exceed 105° C. for 10 minutes. The material was then vulcanized at 150° C. for 100 minutes under a 20 ton pressure in the form of a 8"×8" compression molded pad with a thickness of 0.125". Samples of the appropriate geometry were removed from the vulcanized pad and analyzed. The results of the analysis are given in Tables 3-1 and 3-2 below.

TABLE 3-1

| | EXAMPLE | | | | | | |
|---|---|---|---|---|---|---|---|
| | 3-1 | 3-2 | 3-3 | 3-4 | 3-5 | 3-6 | 3-7 |
| Materials Used | | | | | | | |
| Example 2-1, g | 240 | 0 | 0 | 0 | 0 | 0 | 0 |
| Example 2-2, g | 0 | 240 | 0 | 0 | 0 | 0 | 0 |
| Example 2-3, g | 0 | 0 | 240 | 0 | 0 | 0 | 0 |
| Example 2-4, g | 0 | 0 | 0 | 240 | 0 | 0 | 0 |
| Example 2-5, g | 0 | 0 | 0 | 0 | 240 | 0 | 0 |
| Example 2-6, g | 0 | 0 | 0 | 0 | 0 | 240 | 0 |
| Example 2-7, g | 0 | 0 | 0 | 0 | 0 | 0 | 240 |
| DiCup R, g | 2.9 | 2.9 | 2.9 | 2.9 | 2.9 | 2.9 | 2.9 |
| TAC, g | 3.7 | 3.7 | 3.7 | 3.7 | 3.7 | 3.7 | 3.7 |
| Properties | | | | | | | |
| Tensile Elongation @20"/min, room temp | | | | | | | |
| 50% strain, psi | 82 | 91 | 234 | 340 | 684 | 651 | 835 |
| (MPa) | (0.57) | (0.63) | (1.61) | (2.34) | (4.72) | (4.49) | (5.76) |
| 100% strain, psi | 103 | 113 | 274 | 385 | 669 | 646 | 778 |
| (MPa) | (0.71) | (0.78) | (1.89) | (2.65) | (4.61) | (4.45) | (5.36) |
| 200% strain, psi | 130 | 147 | 317 | 426 | 658 | 626 | 749 |
| (MPa) | (0.90) | (1.01) | (2.19) | (2.94) | (4.54) | (4.32) | (5.16) |
| 500% strain, psi | 537 | 463 | 927 | 1207 | 1627 | 1463 | 1585 |
| (MPa) | (3.70) | (3.19) | (6.39) | (8.32) | (11.22) | (10.09) | (10.93) |
| Ultimate Elongation, % | 563 | 550 | 582 | 578 | 616 | 634 | 660 |
| Ultimate Tensile, psi | 867 | 886 | 1374 | 1688 | 2408 | 2222 | 2506 |
| (MPa) | (6.0) | (6.1) | (9.5) | (11.6) | (16.6) | (15.3) | (17.3) |
| Die C Tear @ max load, room temp, lb force/in (kN/m) | 71 | 77 | 153 | 187 | 316 | 287 | 354 |
| | (12.4) | (13.5) | (26.8) | (32.8) | (55.4) | (50.3) | (62.1) |
| Hardness initial, shore A | 48 | 49 | 65 | 71 | 84 | 83 | 88 |
| % crosslinked, by extraction | 99 | 89 | 79 | 100+ | 89 | 95 | 90 |
| MFR@230° C. (exclusive of curatives) | 3.62 | 16.63 | 15.68 | 3.82 | 4.07 | 16.33 | 20.67 |
| Haze, % | 13.7 | 17.2 | 19.5 | 13.8 | 31.6 | 52.3 | 74.0 |
| Gauge Average, mils | 83.6 | 79.3 | 87.8 | 83.8 | 79.0 | 77.5 | 78.7 |
| Haze %/100 mil | 16.4 | 21.7 | 22.2 | 16.5 | 40.0 | 67.5 | 94.0 |

TABLE 3-2

| | \multicolumn{7}{c}{EXAMPLE} | | | | | | |
|---|---|---|---|---|---|---|---|
| | 3-8 | 3-9 | 3-10 | 3-11 | 3-12 | 3-13 | 3-14 |
| Materials Used | | | | | | | |
| Example 2-1, g | 200 | 0 | 0 | 0 | 0 | 0 | 0 |
| Example 2-2, g | 0 | 200 | 0 | 0 | 0 | 0 | 0 |
| Example 2-3, g | 0 | 0 | 200 | 0 | 0 | 0 | 0 |
| Example 2-4, g | 0 | 0 | 0 | 200 | 0 | 0 | 0 |
| Example 2-5, g | 0 | 0 | 0 | 0 | 200 | 0 | 0 |
| Example 2-6, g | 0 | 0 | 0 | 0 | 0 | 200 | 0 |
| Example 2-7, g | 0 | 0 | 0 | 0 | 0 | 0 | 200 |
| DiCup R, g | 2.9 | 2.9 | 2.9 | 2.9 | 2.9 | 2.9 | 2.9 |
| TAC,g | 3.7 | 3.7 | 3.7 | 3.7 | 3.7 | 3.7 | 3.7 |
| SHF 101, g | 40 | 40 | 40 | 40 | 40 | 40 | 40 |
| Properties | | | | | | | |
| Tensile Elongation @20"/min, room temp | | | | | | | |
| 50% strain, psi | 71 | 61 | 147 | 196 | 447 | 431 | 575 |
| (MPa) | (0.49) | (0.42) | (1.01) | (1.35) | (3.08) | (2.97) | (3.96) |
| 100% strain, psi | 86 | 74 | 175 | 235 | 496 | 484 | 613 |
| (MPa) | (0.59) | (0.51) | (1.21) | (1.62) | (3.42) | (3.34) | (4.23) |
| 200% strain, psi | 105 | 91 | 209 | 281 | 517 | 508 | 631 |
| (MPa) | (0.72) | (0.63) | (1.44) | (1.94) | (3.56) | (3.50) | (4.35) |
| 500% strain, psi | 265 | 256 | 488 | 687 | 983 | 973 | 1124 |
| (MPa) | (1.83) | (1.77) | (3.36) | (4.74) | (6.78) | (6.71) | (7.75) |
| Ultimate Elongation, % | 672 | 656 | 701 | 607 | 759 | 714 | 730 |
| Ultimate Tensile, psi | 671 | 632 | 1031 | 1018 | 1930 | 1671 | 1934 |
| (MPa) | (4.6) | (4.4) | (7.1) | (7.0) | (13.3) | (11.5) | (13.3) |
| Die C Tear @ max load, room temp | 55 | 45 | 101 | 131 | 238 | 228 | 280 |
| lb force/in, (kN/m) | (9.6) | (7.9) | (17.7) | (23.0) | (41.7) | (40.0) | (49.1) |
| Hardness initial, shore A | 40 | 35 | 55 | 57 | 73 | 72 | 75 |
| % crosslinked, by extraction | 98 | 89 | 95 | 99 | 90 | 90 | 93 |
| MFR@230° C. (exclusive of curatives) | 9.8 | 26.9 | 30.0 | 10.2 | 8.9 | 28.7 | 32.8 |
| Haze, % | 15.8 | 16.8 | 17.3 | 16.7 | 31.1 | 34.3 | 42.3 |
| Gauge Average, mils | 81.7 | 77.0 | 77.2 | 79.8 | 74.6 | 75.2 | 77.0 |
| Haze %/100 mil | 19.3 | 21.8 | 22.4 | 20.9 | 41.7 | 45.6 | 54.9 |

Example 4

Certain propylene-based elastomers from Example 2 were blended with isotactic polypropylene according to the formulations given in Table 4. The polymer components were blended in a twin screw extruder with a L/D of 30:1 at a temperature of 200° C. across the length of the barrel. In addition to the polymer components, the compositions of Example 4 each contained 500 ppm of Irganox 1076 as an antioxidant.

Example 5

Certain samples from Example 4 were vulcanized according to the formulations given in Tables 5-1 and 5-2 using the following procedure. The polymer materials were first mixed with the plasticizer and the filler at a temperature of approximately 135 to 145° C. for 10 minutes in a Brabender internal mixer having an internal capacity of about 280 ml. 40 g of the mixture of the polymer and plasicizer was removed for the determination of MFR. The remainder of the mixture was

TABLE 4

| | \multicolumn{16}{c}{EXAMPLE} | | | | | | | | | | | | | | | |
|---|---|---|---|---|---|---|---|---|---|---|---|---|---|---|---|---|
| | 4-1 | 4-2 | 4-3 | 4-4 | 4-5 | 4-6 | 4-7 | 4-8 | 4-9 | 4-10 | 4-11 | 4-12 | 4-13 | 4-14 | 4-15 | 4-16 |
| Example 2-1, g | 200 | 200 | 200 | 200 | 0 | 0 | 0 | 0 | 0 | 0 | 0 | 0 | 0 | 0 | 0 | 0 |
| Example 2-4, g | 0 | 0 | 0 | 0 | 200 | 200 | 200 | 200 | 0 | 0 | 0 | 0 | 0 | 0 | 0 | 0 |
| Example 2-5, g | 0 | 0 | 0 | 0 | 0 | 0 | 0 | 0 | 200 | 200 | 200 | 200 | 0 | 0 | 0 | 0 |
| Example 2-13, g | 0 | 0 | 0 | 0 | 0 | 0 | 0 | 0 | 0 | 0 | 0 | 0 | 200 | 200 | 200 | 200 |
| ESC PP 3155 | 30 | 0 | 0 | 0 | 30 | 0 | 0 | 0 | 30 | 0 | 0 | 0 | 30 | 0 | 0 | 0 |
| ESC 100MFR | 0 | 30 | 0 | 0 | 0 | 30 | 0 | 0 | 0 | 30 | 0 | 0 | 0 | 30 | 0 | 0 |
| ESC PP 3505 | 0 | 0 | 30 | 0 | 0 | 0 | 30 | 0 | 0 | 0 | 30 | 0 | 0 | 0 | 30 | 0 |
| PP Achieve 3936 | 0 | 0 | 0 | 30 | 0 | 0 | 0 | 30 | 0 | 0 | 0 | 30 | 0 | 0 | 0 | 30 | cooled and mixed with the curatives at a temperature not to exceed 105° C. for 10 minutes. The material was then vulcanized at 150° C. for 100 minutes under a 20 ton pressure in the form of a 8"×8" compression molded pad with a thickness of 0.125". Samples of the appropriate geometry were removed from the vulcanized pad and analyzed. The results of the analysis are given in Tables 5-3 and 5-4 below.

TABLE 5-1

| | EXAMPLE | | | | | | | |
|---|---|---|---|---|---|---|---|---|
| | 5-1 | 5-2 | 5-3 | 5-4 | 5-5 | 5-6 | 5-7 | 5-8 |
| Materials Used | | | | | | | | |
| Example 4-1, g | 250 | 0 | 0 | 0 | 0 | 0 | 0 | 0 |
| Example 4-2, g | 0 | 250 | 0 | 0 | 0 | 0 | 0 | 0 |

TABLE 5-1-continued

| | EXAMPLE | | | | | | | |
|---|---|---|---|---|---|---|---|---|
| | 5-1 | 5-2 | 5-3 | 5-4 | 5-5 | 5-6 | 5-7 | 5-8 |
| Example 4-3, g | 0 | 0 | 250 | 0 | 0 | 0 | 0 | 0 |
| Example 4-4, g | 0 | 0 | 0 | 250 | 0 | 0 | 0 | 0 |
| Example 4-5, g | 0 | 0 | 0 | 0 | 250 | 0 | 0 | 0 |
| Example 4-6, g | 0 | 0 | 0 | 0 | 0 | 250 | 0 | 0 |
| Example 4-7, g | 0 | 0 | 0 | 0 | 0 | 0 | 250 | 0 |
| Example 4-8, g | 0 | 0 | 0 | 0 | 0 | 0 | 0 | 250 |
| EMPR 103, g | 25 | 25 | 25 | 25 | 25 | 25 | 25 | 25 |
| DiCup R, g | 2.4 | 2.4 | 2.4 | 2.4 | 2.4 | 2.4 | 2.4 | 2.4 |
| TAC, g | 3 | 3 | 3 | 3 | 3 | 3 | 3 | 3 |

TABLE 5-2

| | EXAMPLE | | | | | | | |
|---|---|---|---|---|---|---|---|---|
| | 5-9 | 5-10 | 5-11 | 5-12 | 5-13 | 5-14 | 5-15 | 5-16 |
| Materials Used | | | | | | | | |
| Example 4-9, g | 250 | 0 | 0 | 0 | 0 | 0 | 0 | 0 |
| Example 4-10, g | 0 | 250 | 0 | 0 | 0 | 0 | 0 | 0 |
| Example 4-11, g | 0 | 0 | 250 | 0 | 0 | 0 | 0 | 0 |
| Example 4-12, g | 0 | 0 | 0 | 250 | 0 | 0 | 0 | 0 |
| Example 4-13, g | 0 | 0 | 0 | 0 | 250 | 0 | 0 | 0 |
| Example 4-14, g | 0 | 0 | 0 | 0 | 0 | 250 | 0 | 0 |
| Example 4-15, g | 0 | 0 | 0 | 0 | 0 | 0 | 250 | 0 |
| Example 4-16, g | 0 | 0 | 0 | 0 | 0 | 0 | 0 | 250 |
| EMPR 103, g | 25 | 25 | 25 | 25 | 25 | 25 | 25 | 25 |
| DiCup R, g | 2.4 | 2.4 | 2.4 | 2.4 | 2.4 | 2.4 | 2.4 | 2.4 |
| TAC, g | 3 | 3 | 3 | 3 | 3 | 3 | 3 | 3 |

TABLE 5-3

| | EXAMPLE | | | | | | | |
|---|---|---|---|---|---|---|---|---|
| | 5-1 | 5-2 | 5-3 | 5-4 | 5-5 | 5-6 | 5-7 | 5-8 |
| Properties | | | | | | | | |
| Tensile Elongation @20"/min, room temp | | | | | | | | |
| 50% strain, psi | 248 | 213 | 229 | 260 | 458 | 448 | 425 | 372 |
| (MPa) | (1.71) | (1.47) | (1.58) | (1.79) | (3.16) | (3.09) | (2.93) | (2.56) |
| 100% strain, psi | 297 | 253 | 272 | 304 | 504 | 490 | 459 | 404 |
| (MPa) | (2.05) | (1.74) | (1.88) | (2.10) | (3.47) | (3.38) | (3.16) | (2.79) |
| 200% strain, psi | 376 | 308 | 338 | 376 | 581 | 564 | 517 | 454 |
| (MPa) | (2.59) | (2.12) | (2.33) | (2.59) | (4.01) | (3.89) | (3.56) | (3.13) |
| 500% strain, psi | 845 | 652 | 670 | 746 | 1153 | 1032 | 940 | 821 |
| (MPa) | (5.83) | (4.50) | (4.62) | (5.14) | (7.95) | (7.12) | (6.48) | (5.66) |
| Ultimate Elongation, % | 657 | 707 | 692 | 682 | 718 | 711 | 803 | 790 |
| Ultimate Tensile, psi | 1364 | 1253 | 1186 | 1203 | 2071 | 1817 | 2028 | 1793 |
| (MPa) | (9.40) | (8.64) | (8.18) | (8.29) | (14.28) | (12.53) | (13.98) | (12.36) |
| Die C Tear @ max load, room temp, lb force/in | 162 | 146 | 171 | 172 | 257 | 260 | 255 | 229 |
| (kN/m) | (28.4) | (25.6) | (30.0) | (30.2) | (45.1) | (45.6) | (44.7) | (40.1) |
| Hardness initial, shore A | 65 | 61 | 62 | 69 | 74 | 78 | 76 | 77 |
| % crosslinked, by extraction | 85 | 97 | 98 | 98 | 95 | 90 | 93 | 87 |
| MFR@230° C. (exclusive of curatives) | 6.3 | 6.2 | 7.8 | 24.6 | 7.1 | 6.8 | 7.2 | 6.5 |
| Haze, % | 16.4 | 16.8 | 37.5 | 62.2 | 26.2 | 16.1 | 14.0 | 11.8 |
| Gauge Average, mils | 71.9 | 72.6 | 72.4 | 72.9 | 72.6 | 74.1 | 72.8 | 73.5 |
| Haze %/100 mil | 22.8 | 23.1 | 51.8 | 85.3 | 36.1 | 21.7 | 19.2 | 16.1 |

TABLE 5-4

| | EXAMPLE | | | | | | | |
|---|---|---|---|---|---|---|---|---|
| | 5-9 | 5-10 | 5-11 | 5-12 | 5-13 | 5-14 | 5-15 | 5-16 |
| Properties | | | | | | | | |
| Tensile Elongation @20"/min, room temp | | | | | | | | |
| 50% strain, psi | 757 | 750 | 747 | 683 | 206 | 228 | 164 | 174 |
| (MPa) | (5.22) | (5.17) | (5.15) | (4.71) | (1.42) | (1.57) | (1.13) | (1.20) |
| 100% strain, psi | 754 | 741 | 736 | 677 | 258 | 287 | 203 | 210 |
| (MPa) | (5.20) | (5.11) | (5.07) | (4.67) | (1.78) | (1.98) | (1.40) | (1.45) |
| 200% strain, psi | 786 | 767 | 765 | 695 | 344 | 386 | 268 | 262 |
| (MPa) | (5.42) | (5.29) | (5.27) | (4.79) | (2.37) | (2.66) | (1.85) | (1.81) |
| 500% strain, psi | 1287 | 1242 | 1247 | 1156 | 810 | 873 | 704 | 517 |
| (MPa) | (8.87) | (8.56) | (8.60) | (7.97) | (5.58) | (6.02) | (4.85) | (3.56) |
| Ultimate Elongation, % | 725 | 726 | 728 | 717 | 661 | 621 | 623 | 437 |
| Ultimate Tensile, psi | 2140 | 2113 | 2116 | 1970 | 1434 | 1298 | 1135 | 455 |
| (MPa) | (14.75) | (14.57) | (14.59) | (13.58) | (9.89) | (8.95) | (7.83) | (3.14) |
| Die C Tear @ max load, room temp, lb force/in | 368 | 364 | 375 | 335 | 152 | 154 | 124 | 119 |
| (kN/m) | (64.5) | (63.8) | (65.7) | (58.7) | (26.6) | (27.0) | (21.7) | (20.9) |
| Hardness initial, shore A | 84 | 87 | 87 | 84 | 60 | 65 | 58 | 58 |
| % crosslinked, by extraction | 90 | 89 | 97 | 96 | 93 | 98 | 99 | 100 |
| MFR@230° C. (exclusive of curatives) | 9.1 | 8.5 | 9.6 | 9 | 13.7 | 12.9 | 10.5 | 10.8 |
| Haze, % | 17.9 | 11.5 | 20.4 | 16.0 | 40.7 | 15.0 | 9.8 | 12.1 |
| Gauge Average, mils | 74.9 | 75.3 | 72.0 | 73.2 | 74.0 | 75.0 | 71.8 | 72.1 |
| Haze %/100 mil | 23.9 | 15.3 | 28.3 | 21.9 | 55.0 | 20.0 | 13.6 | 16.8 |

All patents, test procedures, and other documents cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the invention, including all features which would be treated as equivalents thereof by those skilled in the art to which the invention pertains.

When numerical lower limits and numerical upper limits are listed herein, ranges from any lower limit to any upper limit are contemplated.

What is claimed is:

1. A heat-treated elastomeric blend compound, comprising:
    a continuous phase comprising:
        a propylene based material having
            70-99.9 wt % propylene derived units,
            5-25 wt % ethylene derived units, and
            0.1-10 wt % diene derived units; and
    a dispersed phase comprising:
        a crystalline polypropylene material having at least 96 wt % propylene derived units; and
        from 1% to 30% by weight, based on the total weight of the blend, of a hydrocarbon resin exhibiting an Mn of from 500 to 1000; and
    wherein
        said elastomeric blend compound has a haze % of 30 or less per 100 mil thickness;
        wherein said propylene based material has an isotactic propylene triad tacticity in the range of from 65 to 95% and a heat of fusion of from 5 J/g to 50 J/g as measured prior to blending with said crystalline polypropylene component, and
    the continuous elastomeric phase is crosslinked and envelops domains of the dispersed thermoplastic phase; and wherein
    the elastomeric blend compound is heated to at least the temperature at which 99% of the melting of the crystalline polypropylene component has occurred in a DSC thermogram during or subsequent to crosslinking of the compound.

2. The elastomeric blend compound of claim 1 wherein said crystalline polypropylene material has at least 98 wt % propylene derived units.

3. The elastomeric blend compound of claim 1 wherein said crystalline polypropylene material is isotactic homopolypropylene.

4. The elastomeric blend compound of claim 1 wherein said propylene based material has from 80-99.9 wt % propylene derived units and from 6-25 wt % ethylene derived units.

5. The elastomeric blend compound of claim 1 wherein said elastomeric compound has a haze % of 20 or less per mil thickness.

6. The elastomeric blend compound of claim 1 wherein said hydrocarbon resin is present in an amount of from 5% to 25% by weight, based on the total weight of the blend.

7. A heat-treated crosslinked elastomeric blend, comprising:
    a continuous elastomeric phase comprising:
        a propylene based material having:
            70-99.9 wt % propylene derived units,
            5-25 wt % ethylene derived units, and
            0.1-10 wt % diene derived units; and
    a dispersed thermoplastic phase comprising:
        a crystalline polypropylene material having:
            at least 96 wt % propylene derived units,
        from 1% to 30% by weight, based on the total weight of the blend, of a hydrocarbon resin exhibiting an Mn of from 500 to 1000, wherein
    said crosslinked elastomeric blend has a haze % of 30 or less per 100 mil thickness,
    the propylene based material has an isotactic propylene triad tacticity of from 65 to 95% and a heat of fusion of from 5 J/g to 50 J/g, as measured prior to blending with said crystalline polypropylene component and prior to crosslinking, and
    the continuous elastomeric phase is crosslinked and envelops domains of the dispersed thermoplastic phase; and wherein
    the elastomeric blend compound is heated to at least the temperature at which 99% of the melting of the crystalline polypropylene component has occurred in a DSC thermogram during or subsequent to crosslinking of the compound.

8. The blend of claim 7, wherein the elastomeric phase has an MFR (2.16 kg@230° C. of from 5 to 150 prior to crosslinking.

9. The blend of claim 7, wherein said crystalline polypropylene material has at least 98 wt % propylene derived units.

10. The blend of claim 7, wherein said crystalline polypropylene material is isotactic homopolypropylene.

11. The blend of claim 7, wherein said propylene based material has from 80-99.9 wt % propylene derived units and from 6-25 wt % ethylene derived units.

12. The blend of claim 7, wherein the crosslinked elastomeric blend has a haze % of 20 or less per 100 mil thickness.

13. An article comprising the blend of claim 7.

14. The article of claim 13, wherein the article is an extruded article.

15. The article of claim 13, wherein the article is a molded object.

16. An article comprising the blend of claim 1.

17. The article of claim 1, wherein the article is an extruded article.

18. The article of claim 1, wherein the article is a molded object.

19. The elastomeric blend compound of claim 1, wherein the elastomeric blend compound has been heated to at least about 170° C.

20. The crosslinked elastomeric blend of claim 7, wherein the elastomeric blend compound has been heated to at least about 170° C.

* * * * *